United States Patent
Matsuno

(10) Patent No.: US 8,239,111 B2
(45) Date of Patent: Aug. 7, 2012

(54) VEHICLE DRIVING ASSIST SYSTEM

(75) Inventor: Koji Matsuno, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1192 days.

(21) Appl. No.: 12/041,049

(22) Filed: Mar. 3, 2008

(65) Prior Publication Data

US 2008/0221769 A1  Sep. 11, 2008

(30) Foreign Application Priority Data

Mar. 7, 2007 (JP) .................................. 2007-057612

(51) Int. Cl.
*B60T 7/00* (2006.01)
(52) U.S. Cl. ................. 701/80; 701/72; 701/73; 701/90
(58) Field of Classification Search .................... 701/72, 701/73, 80, 90
See application file for complete search history.

(56) References Cited

U.S. PATENT DOCUMENTS

| 6,904,349 B2 * | 6/2005 | Mori ................................ 701/70 |
| 7,142,970 B2 * | 11/2006 | Inagaki et al. ................... 701/70 |
| 2005/0206224 A1 * | 9/2005 | Lu ...................................... 303/7 |
| 2008/0201051 A1 * | 8/2008 | Yoneda et al. .................. 701/88 |

FOREIGN PATENT DOCUMENTS

JP        2006-256456        9/2006

* cited by examiner

*Primary Examiner* — Lesley D Morris
*Assistant Examiner* — Jacob Knutson
(74) *Attorney, Agent, or Firm* — Smith, Gambrell & Russell, LLP

(57) ABSTRACT

An driving assist control unit controls actuators such as a front wheel steering device, an accelerator pedal mechanism, an alarm lamp. The control units estimates permissible tire-force being capable of acting on the vehicle tire on the basis of road-surface friction coefficient and ground load of the tire, and then calculates tire-force margin by subtracting current tire-force currently acting on the tire, such as total driving force and lateral force, from the permissible tire-force. The control unit then controls steering reaction force of the front wheel steering device, reaction force of the accelerator pedal, and flashing frequency of the alarm lamp in accordance with the magnitude of the tire-force margin, respectively.

14 Claims, 6 Drawing Sheets

VEHICLE DRIVING ASSIST SYSTEM

CROSS REFERENCES TO RELATED APPLICATIONS

The disclosure of Japanese Patent Application No. 2007-057612 filed on Mar. 7, 2007 including the specifications, drawings, and abstracts are incorporated by references herein.

BACKGROUND OF THE INVENTION

1. Field of the Invention

The present invention relates to a vehicle driving assist system for assisting driver operations.

2. Description of the Related Art

In recent years, vehicles are equipped with various types of control devices for enhancing safety. Such various types of control devices include a skid preventing device for preventing skidding by applying a braking force to a specific wheel when the vehicle behavior becomes unstable, and a traction control device that minimizes excessive slipping of the drive wheels. Generally, when the control is activated, these control devices bring the activation to the driver's attention by turning on an alarm lamp or letting out a warning sound.

For example, Japanese Unexamined Patent Application Publication No. 2006-256456 discloses a vehicle driving-force distribution control device for controlling the driving-force distribution among front and rear wheels of a vehicle. In this device, a steering operation amount by the driver is detected, and a limit determination value of the steering operation-amount is set in a range close to a cornering-force limit based on a skid angle of the front wheels. When the steering operation amount exceeds the limit determination value, the driving-force distribution to the steering wheels is reduced in a stepwise manner so as to assist driver's operations.

However, with the technology which assists driver's operation at the time of activation of the device, as in the aforementioned skid preventing device and traction control device, the assisting process is implemented after the vehicle has already become unstable. Therefore, this assisting function for the safety of the driver does not sufficiently exhibit its effect. On the other hand, in the technology disclosed in Japanese Unexamined Patent Application Publication No. 2006-256456 where the assisting process starts upon comparison with a determination value, the timing for starting the assisting process may unfavorably change depending on how the determination value is set. In addition, there may be a case where the assisting process starts suddenly even though the condition that should have been assisted continuously to the driver was already expected to occur, giving the driver a sense of discomfort.

SUMMARY OF THE INVENTION

The present invention has been made under such circumstances, and it is an object of the present invention to provide driving assist system of the vehicle that assists a driver's operations in accordance with continuously changing running condition of a vehicle so that the driver can perform an optimal driving operation.

The present invention provides a vehicle driving assist system that includes road-surface friction coefficient estimating means configured to estimate a road-surface friction coefficient of a road where a vehicle is running; ground-load estimating means configured to estimate ground loads acting on a tire of the vehicle; permissible tire-force estimating means configured to estimate a permissible tire-force being capable of acting on the tire on the basis of the road-surface friction coefficient and the ground-load; current tire-force estimating means configured to estimate a current tire-force currently acting on the tire; tire-force margin calculating means configured to calculate a tire-force margin on the basis of the permissible tire-force and the current tire-force; and actuator controlling means configured to activate an actuator in accordance with a magnitude of the tire-force margin.

The vehicle driving assist system according to the present invention can assist a driver's operations in accordance with continuously changing running condition of a vehicle so that the driver can perform an optimal driving operation.

DESCRIPTION OF THE PREFERRED EMBODIMENTS

Embodiments of the present invention will now be described with reference to the drawings.

FIGS. 1 to 9 illustrate an embodiment of the present invention.

Figure 1:
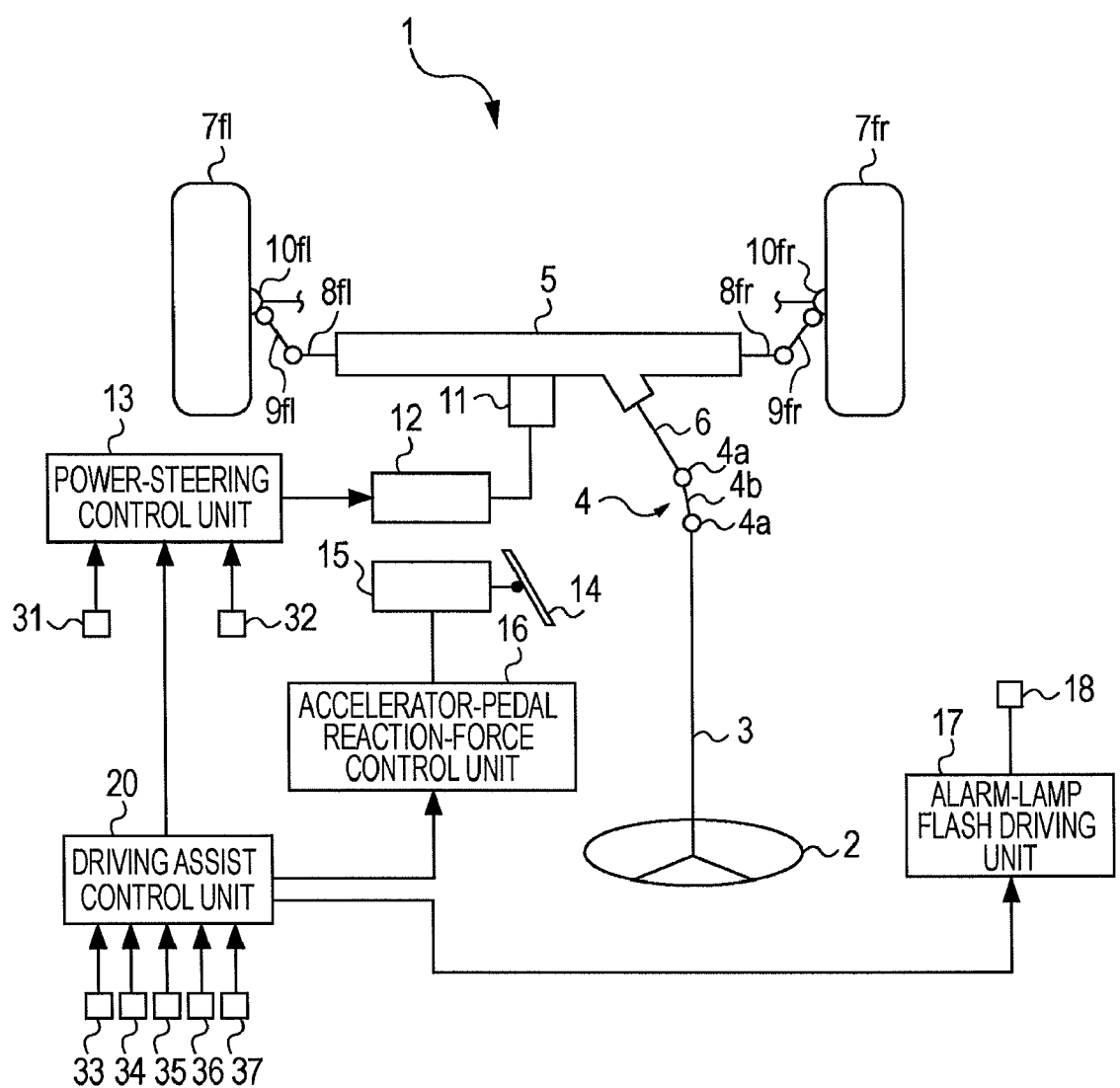
FIG. 1 is a schematic diagram showing entire components of a driving assist system.

Referring to FIG. 1, reference numeral 1 denotes a front-wheel steering device. The front-wheel steering device 1 has a steering shaft 3 that extends from a steering wheel 2. A front end of the steering shaft 3 is linked to a pinion shaft 6, which projects from a steering gear box 5, via a joint portion 4 constituted by universal joints 4a and 4a and a joint shaft 4b.

The steering gear box 5 has a tie rod 8*fl* projecting therefrom towards a left front wheel 7*fl* (=a left front tire) and a tie rod 8*fr* projecting therefrom towards a right front wheel 7*fr* (=a right front tire).

The tie rod ends of the tie rods 8*fl* and 8*fr* are respectively linked to axle housings 10*fl* and 10*fr* via knuckle arms 9*fl* and 9*fr*. The axle housings 10*fl* and 10*fr* rotatably support the respective wheels 7*fl* and 7*fr*.

The front-wheel steering device 1 is equipped with an electric power-steering mechanism 11 of, for example, a known rack assist type. A power-steering electric motor (not shown) for this electric power-steering mechanism 11 is driven by a power-steering-motor driving portion 12. The power-steering-motor driving portion 12 drives the power-steering electric motor on the basis of a signal from a power-steering control unit 13.

The power-steering control unit 13 is connected to a vehicle-speed sensor 31 that detects a vehicle speed V and to a steering-torque sensor 32 that detects a steering torque TH. Basically, the power-steering control unit 13 determines an assist current IP of the power-steering electric motor on the basis of a vehicle speed V and a steering torque TH from the map shown in FIG. 5, and outputs a signal to the power-steering-motor driving portion 12.

The power-steering control unit 13 is connected to an driving assist control unit 20 to be described hereinafter, and receives a reaction-force correction amount $\Delta F_{fH}$ of the steering wheel 2 therefrom. When the power-steering control unit 13 receives a reaction-force correction amount $\Delta F_{fH}$ Of the steering wheel 2, an assist current according to the reaction-force correction amount $\Delta F_{fH}$ is subtracted from the assist current IP set based on the aforementioned map, thereby reducing the assist amount.

Specifically, the larger the reaction-force correction amount $\Delta F_{fH}$ of the steering wheel 2 received by the power-steering control unit 13, the greater the degree of assist amount reduced. As a result, the reaction force with respect to the driver becomes greater.

Reference numeral 14 denotes an accelerator pedal. The accelerator pedal 14 is equipped with an accelerator-pedal control mechanism 15 constituted by a servomotor and a driver for give reaction force against accelerator pedal operation by a driver. The accelerator-pedal control mechanism 15 is controlled by an accelerator-pedal control unit 16. Generally, the characteristics of the reaction force of the accelerator pedal are set such that, for example, the reaction force increases linearly with an increase in the stroke amount of the accelerator pedal 14.

The accelerator-pedal control unit 16 is connected to the driving assist control unit 20 to be described hereinafter, and receives an reaction-force correction amount $\Delta F_{AP}$ of the accelerator pedal 14 therefrom. Upon receiving the reaction-force correction amount $\Delta F_{AP}$, the accelerator-pedal control unit 16 increases the reaction force by an amount corresponding to the input value.

A combination meter (not shown) of the vehicle is equipped with an alarm lamp 18 that is flashed with a frequency according to a signal from the driving assist control unit 20 to be described hereinafter via an alarm-lamp flash driving unit 17.

The driving assist control unit 20 is connected to an engine control unit 33, a transmission control unit 34, a road-surface friction coefficient estimating device 35 serving as road-surface friction coefficient estimating means, a yaw-rate sensor 36, and a lateral-acceleration sensor 37, and receives therefrom signals indicating an engine torque $T_{eg}$, an engine speed $N_e$, a main transmission gear ratio i, a turbine speed $N_t$ of a torque converter, a road-surface friction coefficient μ of a road where the vehicle is running, a yaw rate γ, and a lateral acceleration $(d^2y/dt^2)$. Based on these input signals, the driving assist control unit 20 calculates a driving force (total driving force) acting in the front-rear direction on whole tires including the left front tire 7fl, the right front tire 7fr, a left rear tire (not shown), and a right rear tire (not shown) of the vehicle as a current front-rear tire-force and also calculates lateral forces acting on the individual four tires as current lateral tire-forces, and also estimate ground loads acting on the individual four tires. The driving assist control unit 20 calculates permissible tire-forces from the road-surface friction coefficient and the ground loads acting on the individual tires. Based on the calculated permissible tire-forces and the current lateral tire-forces of the front tires, the driving assist control unit 20 determines a remaining allowance of the generable front-tire lateral forces as lateral tire-force margins, and determines a correction amount of a reaction force of the steering wheel 2 (i.e. a correction amount for increasing the reaction force of the steering wheel) in accordance with the lateral tire-force margins as a steering-reaction-force correction amount. The driving assist control unit 20 outputs the determined amount to the power-steering control unit 13. In addition, based on the permissible tire-forces of the four tires and the total driving force, the driving assist control unit 20 determines a remaining allowance of generable driving force as a front-rear tire-force margin, and determines a correction amount of a reaction force of the accelerator-pedal 14 (i.e. a correction amount for increasing the reaction force) in accordance with the front-rear tire-force margin as an accelerator-pedal-reaction-force correction amount. The driving assist control unit 20 outputs the determined amount to the accelerator-pedal reaction-force control unit 16. Moreover, the driving assist control unit 20 sets the flashing frequency for the alarm lamp 18 in accordance with the lateral tire-force margins and the front-rear tire-force margin, and outputs the set flashing frequency to the alarm-lamp flash driving unit 17.

Figure 2:
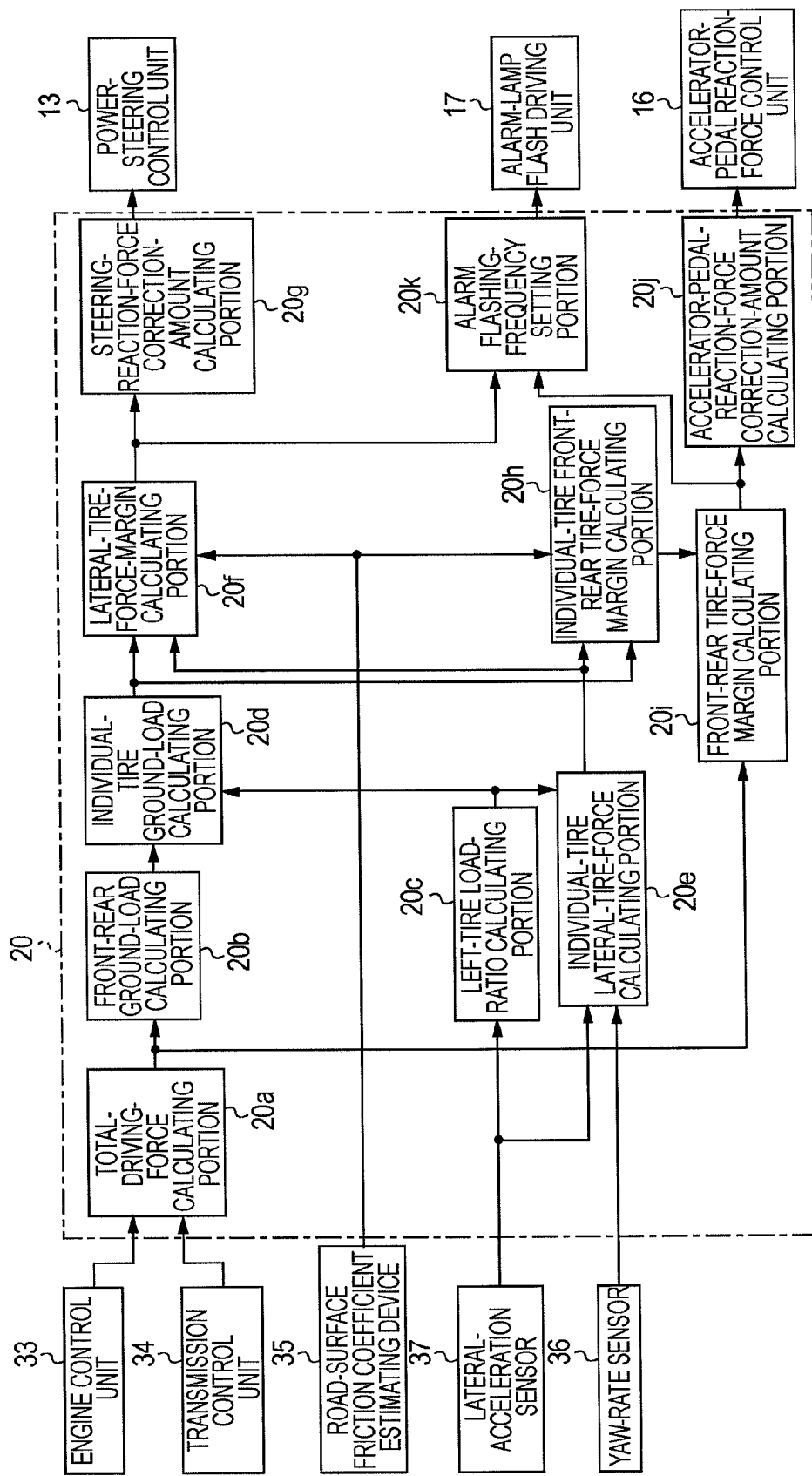
FIG. 2 is a functional block diagram of the driving assist system.

Referring to FIG. 2, the driving assist control unit 20 mainly includes a total-driving-force calculating portion 20a, a front-rear ground-load calculating portion 20b, a left-tire load-ratio calculating portion 20c, an individual-tire ground-load calculating portion 20d, an individual-tire lateral-tire-force calculating portion 20e, a lateral-tire-force-margin calculating portion 20f, a steering-reaction-force correction-amount calculating portion 20g, an individual-tire front-rear tire-force margin calculating portion 20h, a front-rear tire-force-margin calculating portion 20i, an accelerator-pedal-reaction-force correction-amount calculating portion 20j, and an alarm flashing-frequency setting portion 20k.

The total-driving-force calculating portion 20a receives the engine torque $T_{eg}$ and the engine speed $N_e$ from the engine control unit 33, and also receives the main transmission gear ratio i and the turbine speed $N_t$ of the torque converter from the transmission control unit 34. The total-driving-force calculating portion 20a calculates a total driving force $F_x$ from the following expression (1) and outputs the calculated value to the front-rear ground-load calculating portion 20b and the accelerator-pedal-reaction-force correction-amount calculating portion 20j.

$$F_x = T_t \cdot \eta \cdot i_f / R_t \tag{1}$$

Here, η indicates a transmission efficiency of a driving system, $i_f$ indicates a final gear ratio, and $R_t$ indicates a tire radius. Furthermore, $T_t$ indicates a transmission output torque, which can be calculated from the following expression (2)

$$T_t = T_{eg} \cdot t \cdot i \tag{2}$$

where t indicates a torque ratio of the torque converter, which is determined by referring to a preliminarily set map that shows a relationship between a rotational velocity ratio e ($=N_t/N_e$) of the torque converter and a torque ratio of the torque converter. In other words, the total-driving-force calculating portion 20a is provided as current tire-force estimating means.

The front-rear ground-load calculating portion 20b receives the total driving force $F_x$ from the total-driving-force calculating portion 20a. The front-rear ground-load calculating portion 20b calculates a front-tire ground load $F_{zf}$ from the following expression (3) and a rear-tire ground load $F_{zr}$ from the following expression (4), and outputs the calculated values to the individual-tire ground-load calculating portion 20d.

$$F_{zf} = W_f - ((m \cdot A_x \cdot h)/L) \tag{3}$$

$$F_{zr} = W - F_{zf} \tag{4}$$

Here, $W_f$ indicates a front-tire static load, m indicates a vehicle mass, h indicates the height of the center of mass, L indicates a wheel base, W indicates the weight of the vehicle (=m·G; G being gravitational acceleration), and $A_x$ indicates a longitudinal acceleration (=$F_x$/m).

The left-tire load-ratio calculating portion 20c receives a lateral acceleration ($d^2y/dt^2$) from the lateral-acceleration sensor 37. The left-tire load-ratio calculating portion 20c calculates a left-tire load-ratio $WR\_l$ from the following expression (5) and outputs the calculated value to the individual-tire ground-load calculating portion 20d and the individual-tire lateral-force calculating portion 20e.

$$WR\_l = 0.5 - ((d^2y/dt^2)/G) \cdot (h/L_{tred}) \tag{5}$$

Here, $L_{tred}$ indicates an average tread value between the front and rear tires.

The individual-tire ground-load calculating portion 20d receives the front-tire ground load $F_{zf}$ and the rear-tire ground load $F_{zr}$ from the front-rear ground-load calculating portion 20b, and also receives the left-tire load-ratio $WR\_l$ from the left-tire load-ratio calculating portion 20c. The individual-tire ground-load calculating portion 20d then calculates a left-front-tire ground load $F_{zf\_l}$, a right-front-tire ground load $F_{zf\_r}$, a left-rear-tire ground load $F_{zr\_l}$, and a right-rear-tire ground load $F_{zr\_r}$ from the following expressions (6) to (9), respectively, and outputs the left-front-tire ground load $F_{zf\_l}$ and the right-front-tire ground load $F_{zf\_r}$ to the lateral-tire-force-margin calculating portion 20f, and outputs the left-front-tire ground load $F_{zf\_l}$, the right-front-tire ground load $F_{zf\_r}$, the left-rear-tire ground load $F_{zr\_l}$, and the right-rear-tire ground load $F_{zr\_r}$ to the individual-tire front-rear tire-force margin calculating portion 20h. In other words, the individual-tire ground-load calculating portion 20d is provided as ground-load estimating means.

$$F_{zf\_l} = F_{zf} \cdot WR\_l \tag{6}$$

$$F_{zf\_r} = F_{zf} \cdot (1 - WR\_l) \tag{7}$$

$$F_{zr\_l} = F_{zr} \cdot WR\_l \tag{8}$$

$$F_{zr\_r} = F_{zr} \cdot (1 - WR\_l) \tag{9}$$

The individual-tire lateral-tire-force calculating portion 20e receives the lateral acceleration ($d^2y/dt^2$) from the lateral-acceleration sensor 37, the yaw rate y from the yaw-rate sensor 36, and the left-tire load-ratio $WR\_l$ from the left-tire load-ratio calculating portion 20c. The individual-tire lateral-tire-force calculating portion 20e then calculates a front-tire lateral tire-force $F_{yf}$ from the following expression (10) and a rear-tire lateral tire-force $F_{yr}$ from the following expression (11). Based on the front-tire lateral tire-force $F_{yf}$ and the rear-tire lateral tire-force $F_{yr}$, the individual-tire lateral-tire-force calculating portion 20e calculates a left-front-tire lateral tire-force $F_{yf\_l}$, a right-front-tire lateral tire-force $F_{yf\_r}$, a left-rear-tire lateral tire-force $F_{yr\_l}$, and a right-rear-tire lateral tire-force $F_{yr\_r}$ from the following expressions (12) to (15), and outputs the left-front-tire lateral tire-force $F_{yf\_l}$ and the right-front-tire lateral tire-force $F_{yf\_r}$ to the lateral-tire-force-margin calculating portion 20f, and outputs the left-front-tire lateral tire-force $F_{yf\_l}$, the right-front-tire lateral tire-force $F_{yf\_r}$, the left-rear-tire lateral tire-force $F_{yr\_l}$, and the right-rear-tire lateral tire-force $F_{yr\_r}$ to the individual-tire front-rear tire-force margin calculating portion 20h. In other words, the individual-tire lateral-tire-force calculating portion 20e is provided as current tire-force estimating means.

$$F_{yf} = (I_z \cdot (d\gamma/dt) + m \cdot (d^2y/dt^2) \cdot L_r)/L \tag{10}$$

$$F_{yr} = (-I_z \cdot (d\gamma/dt) + m \cdot (d^2y/dt^2) \cdot L_f)/L \tag{11}$$

Here, $I_z$ indicates a yaw moment of inertia of the vehicle, $L_r$ indicates a distance between the rear axle and the center of mass, and $L_f$ indicates a distance between the front axle and the center of mass.

$$F_{yf\_l} = F_{yf} \cdot WR\_l \tag{12}$$

$$F_{yf\_r} = F_{yf} \cdot (1 - WR\_l) \tag{13}$$

$$F_{yr\_l} = F_{yr} \cdot WR\_l \tag{14}$$

$$F_{yr\_r} = F_{yr} \cdot (1 - WR\_l) \tag{15}$$

The lateral-tire-force-margin calculating portion 20f receives the road-surface friction coefficient µ from the road-surface friction coefficient estimating device 35, the left-front-tire ground load $F_{zf\_l}$ and the right-front-tire ground load $F_{zf\_r}$ from the individual-tire ground-load calculating portion 20d, and the left-front-tire lateral tire-force $F_{yf\_l}$ and the right-front-tire-lateral tire-force $F_{yf\_r}$ from the individual-tire lateral-tire-force calculating portion 20e. The lateral-tire-force-margin calculating portion 20f then calculates a lateral tire-force margin $F_{yf\_lM}$ of the left front tire from the following expression (16) and a lateral tire-force margin $F_{yf\_rM}$ of the right front tire from the following expression (17).

$$F_{yf\_lM} = \mu \cdot F_{zf\_r} - |F_{yf\_l}| \tag{16}$$

$$F_{yf\_rM} = \mu \cdot F_{zf\_r} - |F_{yr\_r}| \tag{17}$$

In other words, in these expressions (16) and (17), permissible tire-force $\mu \cdot F_{zf\_l}$ and $\mu \cdot F_{zf\_r}$ are calculated from the road-surface friction coefficient µ and the ground loads $F_{zf\_l}$ and $F_{zf\_r}$, and the front-tire lateral tire-forces $F_{yf\_l}$ and $F_{yf\_r}$ as current tire-forces are subtracted from these permissible tire-force $\mu \cdot F_{zf\_l}$ and $\mu \cdot F_{zf\_r}$ in order to determine a remaining allowance of the generable tire-forces as lateral tire-force margins $F_{yf\_lM}$ and $F_{yf\_rM}$. The lateral-tire-force-margin calculating portion 20f compares the left-front-tire lateral-tire-force margin $F_{yf\_lM}$ with the right-front-tire lateral-tire-force margin $F_{yf\_rM}$, and finally determines the lower tire-force margin, namely, the margin without allowance, as a lateral tire-force margin $F_{ym}$. The lateral-tire-force-margin calculating portion 20f then outputs the lateral tire-force margin $F_{ym}$ to the steering-reaction-force correction-amount calculating portion 20g and the alarm flashing-frequency setting portion 20k. In other words, the lateral-tire-force-margin calculating portion 20f is provided as tire-force margin calculating means.

The steering-reaction-force correction-amount calculating portion 20g receives the lateral tire-force margin $F_{ym}$ from the lateral-tire-force-margin calculating portion 20f. For example, referring to FIG. 6, the steering-reaction-force correction-amount calculating portion 20g refers to a preliminarily set characteristic diagram to set a steering-reaction-force correction amount $\Delta F_{fH}$, and outputs the steering-reaction-force correction amount $\Delta F_{fH}$ to the power-steering control unit 13. In this case, if the lateral tire-force margin $F_{ym}$ is smaller than a preliminarily set threshold value C1, the steering-reaction-force correction-amount calculating portion 20g sends a command signal for commanding vibration at a predetermined frequency to the power-steering control unit 13 in addition to sending the signal indicating the steering-reaction-force correction amount $\Delta F_{fH}$.

Figure 6:
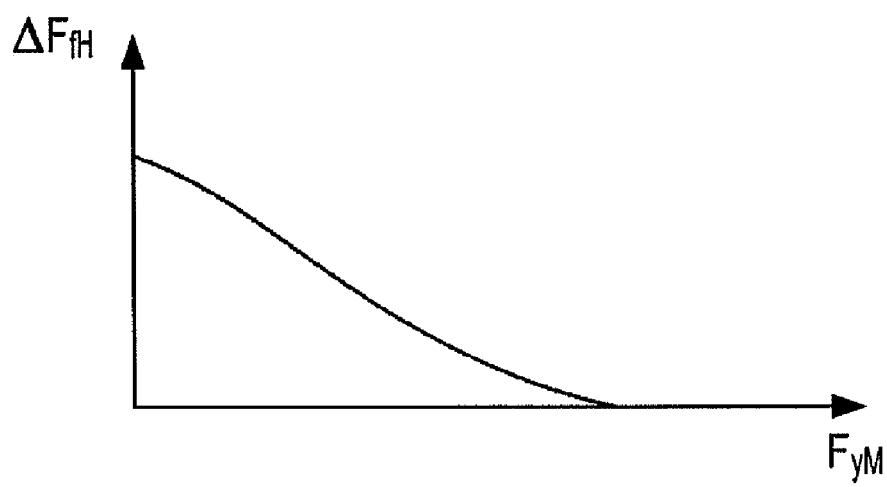
FIG. 6 is a characteristic diagram of a reaction-force correction amount of a steering wheel set on the basis of a front-wheel lateral-force margin.

In the characteristic diagram shown in FIG. 6, the abscissa axis indicates the lateral tire-force margin $F_{ym}$ and the ordinate axis indicates the steering-reaction-force correction amount $\Delta F_{fH}$. The steering-reaction-force correction amount $\Delta F_{fH}$ becomes greater as the lateral tire-force margin $F_{ym}$ decreases. Specifically, as the lateral force margin $F_{ym}$ decreases, the steering reaction force increases to give the driver a stronger warning.

In other words, the steering-reaction-force correction-amount calculating portion 20g is provided as actuator controlling means.

The individual-tire front-rear tire-force margin calculating portion 20h receives the road-surface friction coefficient μ from the road-surface friction coefficient estimating device 35, receives the left-front-tire ground load $F_{zf\_l}$, the right-front-tire ground load $F_{zf\_r}$, the left-rear-tire ground load $F_{zr\_l}$, and the right-rear-tire ground load $F_{zr\_r}$ from the individual-tire ground-load calculating portion 20d, and receives the left-front-tire lateral tire-force $F_{yf\_l}$, the right-front-tire lateral tire-force $F_{yf\_r}$, the left-rear-tire lateral tire-force $F_{yr\_l}$, and the right-rear-tire lateral tire-force $F_{yr\_r}$ from the individual-tire lateral-tire-force calculating portion 20e. Then, based on the following expressions (18) to (21), the individual-tire front-rear tire-force margin calculating portion 20h calculates front-rear tire-force margin of the respective tires as a front-rear tire-force margin $F_{x0f\_l}$ of the left-front-tire, a front-rear tire-force margin $F_{x0f\_r}$ of the right-front-tire, a front-rear tire-force margin $F_{x0r\_l}$ of the left-rear-tire, and a front-rear tire-force margin $F_{x0r\_r}$ of the right-rear-tire. The individual-tire front-rear tire-force margin calculating portion 20h then outputs these calculated values to the front-rear tire-force margin calculating portion 20i.

$$F_{x0f\_l} = ((\lambda \cdot F_{zf\_l})^2 - F_{yf\_l}^2)^{1/2} \quad (18)$$

$$F_{x0f\_r} = ((\mu \cdot F_{zf\_r})^2 - F_{yf\_r}^2)^{1/2} \quad (19)$$

$$F_{x0r\_l} = ((\mu \cdot F_{zr\_l})^2 - F_{yr\_l}^2)^{1/2} \quad (20)$$

$$F_{x0r\_r} = ((\mu \cdot F_{zr\_r})^2 - F_{yr\_r}^2)^{1/2} \quad (21)$$

The front-rear tire-force margin calculating portion 20i receives the total driving force $F_x$ from the total-driving-force calculating portion 20a, and also receives the front-rear tire-force $F_{x0f\_l}$, $F_{x0f\_r}$, $F_{x0r\_l}$ and $F_{x0r\_r}$ from the individual-tire front-rear tire-force margin calculating portion 20h. The front-rear tire-force margin calculating portion 20i then calculates a front-rear tire-force margin $F_{x0M}$ from the following expression (22) and outputs the calculated front-rear tire-force margin $F_{x0M}$ to the accelerator-pedal-reaction-force correction-amount calculating portion 20j and the alarm flashing-frequency setting portion 20k.

$$F_{x0M} = (F_{x0f\_l} + F_{x0f\_r} + F_{x0r\_l} + F_{x0r\_r}) - F_x \quad (22)$$

In other words, in expression (22), the total driving force $F_x$ as a current tire-force is subtracted from the front-rear tire-force margin ($F_{x0f\_l} + F_{x0f\_r} + F_{x0r\_l} + F_{x0r\_r}$) in order to determine a remaining allowance of the generable tire-force as a front-rear tire-force margin $F_{x0M}$. Therefore, in this embodiment, the individual-tire front-rear tire-force margin calculating portion 20h and the front-rear tire-force margin calculating portion 20i constitute tire-force margin calculating means.

The accelerator-pedal-reaction-force correction-amount calculating portion 20j receives the front-rear tire-force margin $F_{x0M}$ from the front-rear tire-force-margin calculating portion 20i. For example, referring to FIG. 7, the accelerator-pedal-reaction-force correction-amount calculating portion 20j refers to a preliminarily set characteristic diagram to set an accelerator-pedal-reaction-force correction amount $\Delta F_{AP}$, and outputs the accelerator-pedal-reaction-force correction amount $\Delta F_{AP}$ to the accelerator-pedal reaction-force control unit 16. In this case, if the front-rear tire-force margin $F_{x0M}$ is smaller than a preliminarily set threshold value C2, the accelerator-pedal-reaction-force correction-amount calculating portion 20j sends a command signal for commanding vibration at a predetermined frequency to the accelerator-pedal reaction-force control unit 16 in addition to sending the signal indicating the accelerator-pedal-reaction-force correction amount $\Delta F_{AP}$.

Figure 7:
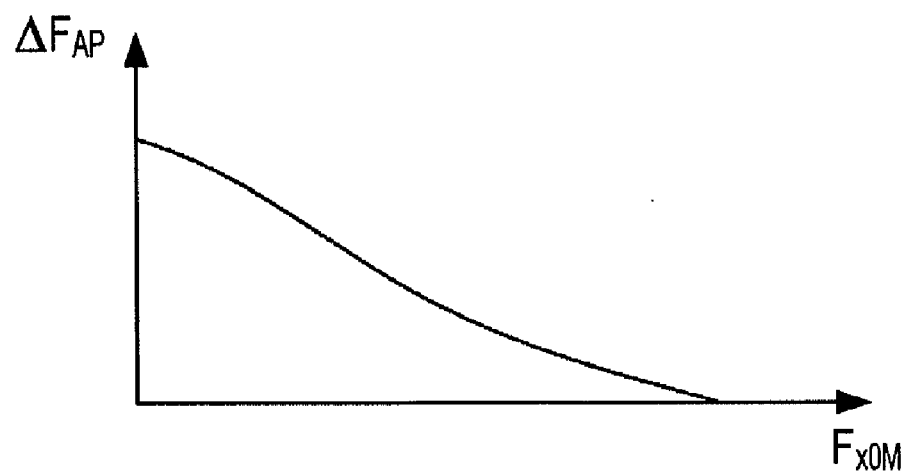
FIG. 7 is a characteristic diagram of a reaction-force correction amount of an accelerator pedal set on the basis of a driving force margin.

In the characteristic diagram shown in FIG. 7, the abscissa axis indicates the front-rear tire-force margin $F_{x0M}$ and the ordinate axis indicates the accelerator-pedal-reaction-force correction amount $\Delta F_{AP}$. The accelerator-pedal-reaction-force correction amount $\Delta F_{AP}$ becomes greater as the front-rear tire-force margin $F_{x0M}$ decreases. Specifically, as the front-rear tire-force margin $F_{x0M}$ decreases, the accelerator-pedal reaction force increases to give the driver a stronger warning.

In other words, the accelerator-pedal-reaction-force correction-amount calculating portion 20j is provided as actuator controlling means.

The alarm flashing-frequency setting portion 20k receives the lateral tire-force margin $F_{ym}$ from the lateral-tire-force-margin calculating portion 20f and also receives the front-rear tire-force margin $F_{x0M}$ from the front-rear tire-force-margin calculating portion 20i. For example, referring to FIGS. 8 and 9, the alarm flashing-frequency setting portion 20k refers to preliminarily set characteristic diagrams to set an alarm flashing frequency, and outputs the alarm flashing frequency to the alarm-lamp flash driving unit 17.

Figure 8:
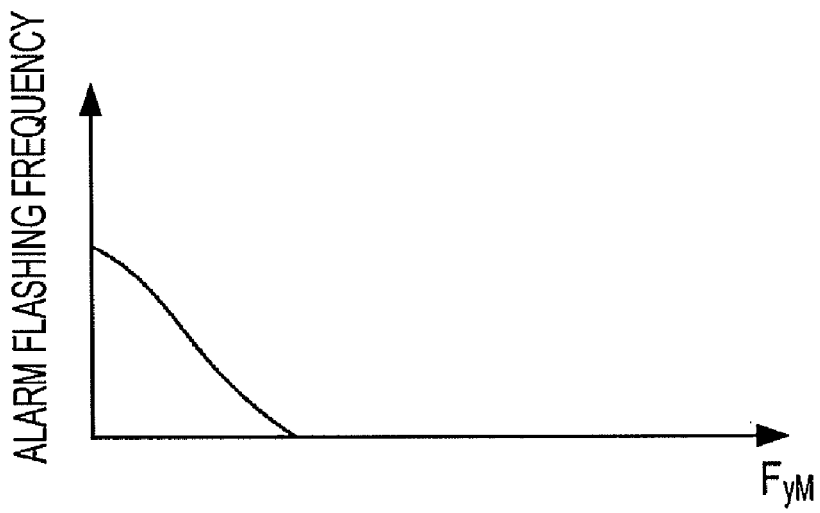
FIG. 8 is a characteristic diagram of an alarm flashing frequency set on the basis of a lateral force margin.

In the characteristic diagram shown in FIG. 8, the abscissa axis indicates the lateral tire-force margin $F_{ym}$ and the ordinate axis indicates the alarm flashing frequency. The alarm flashing frequency becomes greater as the lateral tire-force margin $F_{ym}$ decreases, thereby giving the driver a stronger warning. Likewise, in the characteristic diagram shown in FIG. 9, the abscissa axis indicates the front-rear tire-force margin $F_{x0M}$ and the ordinate axis indicates the alarm flashing frequency. The alarm flashing frequency becomes greater as the driving force margin $F_{x0M}$ decreases, thereby giving the driver a stronger warning. The alarm flashing-frequency setting portion 20k compares the alarm flashing frequencies respectively set based on the lateral tire-force margin $F_{ym}$ and the front-rear tire-force margin $F_{x0M}$, and finally determines the higher frequency, namely, the frequency with the higher level of importance for warning the driver, as an alarm flashing frequency.

In other words, the alarm flashing-frequency setting portion 20k is provided as actuator controlling means.

Figure 3:
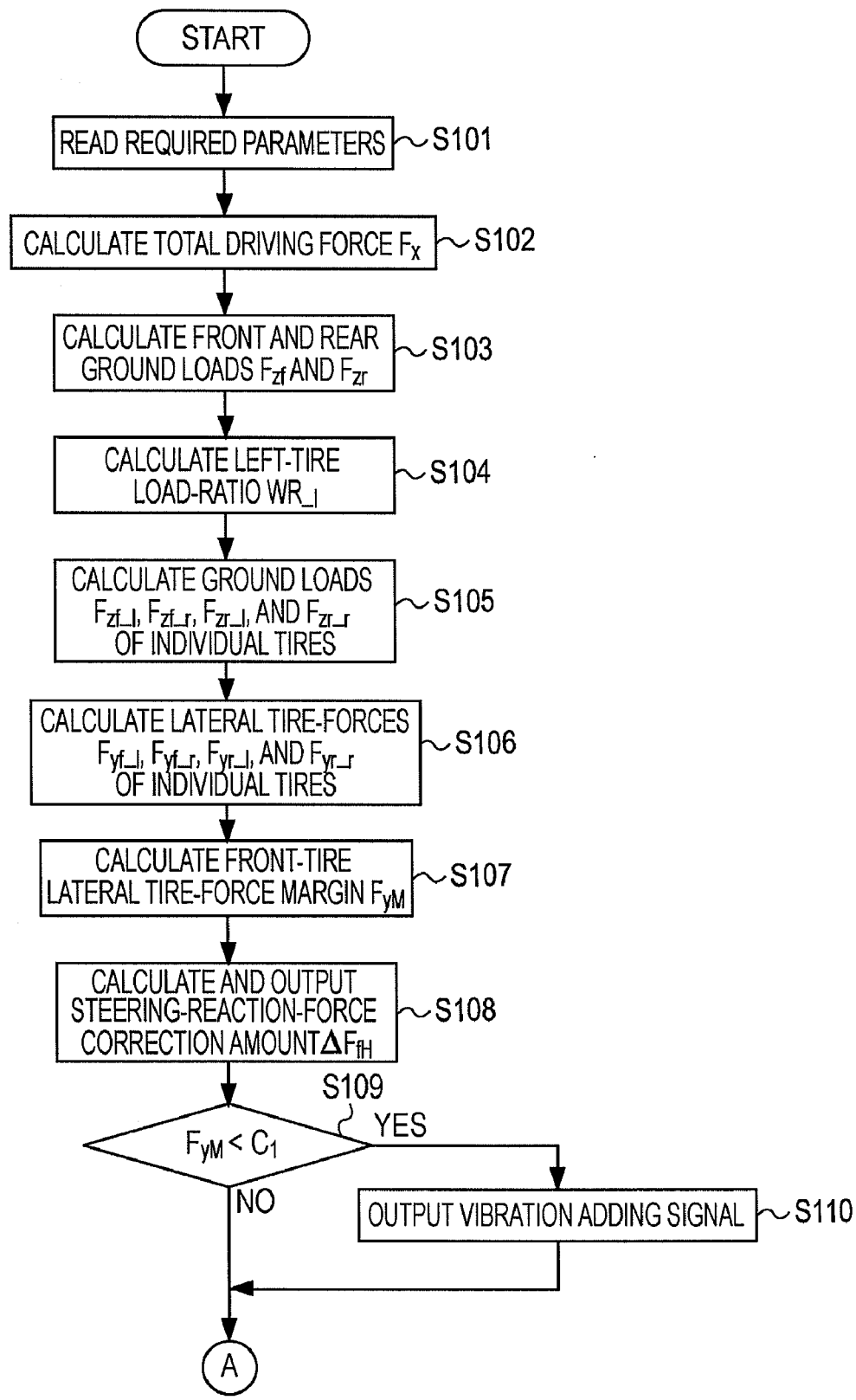
FIG. 3 is a flow chart of a control program which the driving assist system performs.
Figure 4:
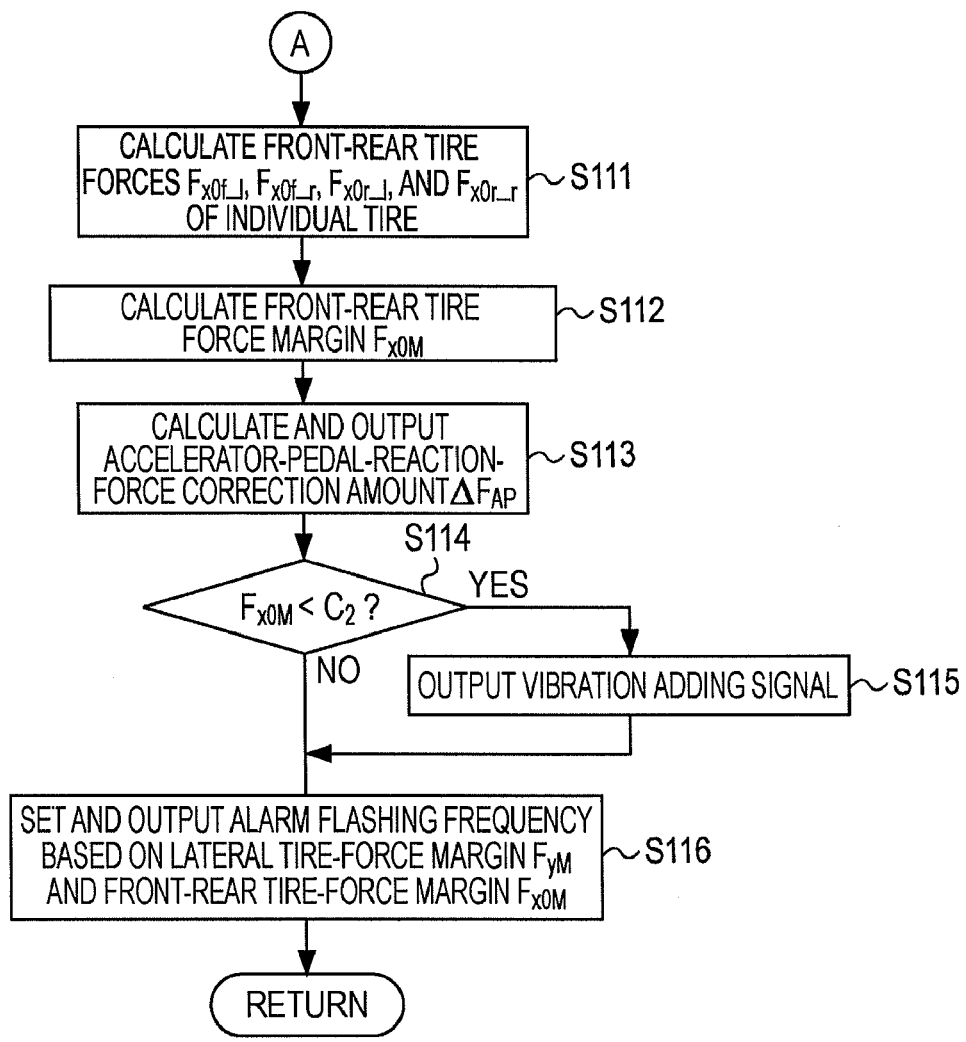
FIG. 4 is a flow chart continuing from that in FIG. 3.
Figure 5:
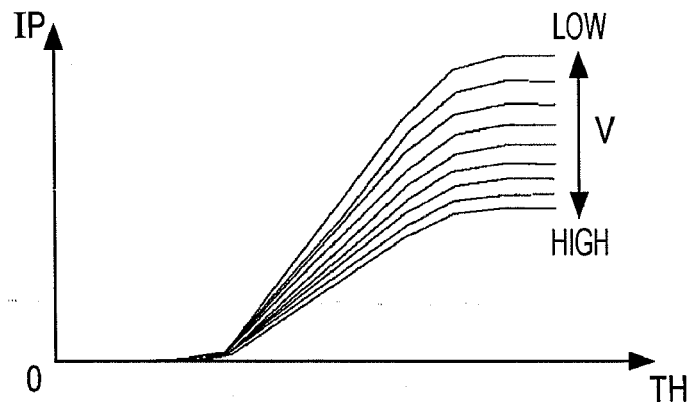
FIG. 5 illustrates a map of an assist current determined on the basis of a vehicle speed and a steering torque.

An information control program to be executed by the information control unit 20 will be described below with reference to the flow charts shown in FIGS. 3 and 4.

In step S101, required parameters are read, which include signals indicating an engine torque $T_{eg}$, an engine speed $N_e$, a main transmission gear ratio i, a turbine speed $N_t$ of a torque converter, a road-surface friction coefficient μ, a yaw rate γ, and a lateral acceleration ($d^2y/dt^2$).

In step S102, the total-driving-force calculating portion 20a calculates a total driving force $F_x$ from the aforementioned expression (1).

In step S103, the front-rear ground-load calculating portion 20b calculates a front-tire ground load $F_{zf}$ from the aforementioned expression (3) and a rear-tire ground load $F_{zr}$ from the aforementioned expression (4).

In step S104, the left-tire load-ratio calculating portion 20c calculates a left-tire load-ratio $WR_{\_l}$ from the aforementioned expression (5).

In step S105, the individual-tire ground-load calculating portion 20d calculates a left-front-tire ground load $F_{zf\_l}$, a right-front-tire ground load $F_{zf\_r}$, a left-rear-tire ground load $F_{zr\_l}$, and a right-rear-tire ground load $F_{zr\_r}$ from the aforementioned expressions (6) to (9).

In step S106, the individual-tire lateral-tire-force calculating portion 20e calculates a left-front-tire lateral tire-force $F_{yf\_l}$, a right-front-tire lateral tire-force $F_{yf\_r}$, a left-rear-tire lateral tire-force $F_{yr\_l}$, and a right-rear-tire lateral tire-force $F_{yr\_r}$ from the aforementioned expressions (12) to (15).

In step S107, the lateral-tire-force-margin calculating portion 20f calculates a lateral tire-force margin $F_{yf\_lM}$ of the left front tire from the aforementioned expression (16) and a lateral tire-force margin $F_{yf\_rM}$ of the right front tire from the aforementioned expression (17). The lateral-tire-force-margin calculating portion 20f then compares the left-front-tire lateral-tire-force margin $F_{yf\_lM}$ with the right-front-tire lateral-tire-force margin $F_{yf\_rM}$, and finally determines the lower tire-force margin as a lateral tire-force margin $F_{ym}$.

In step S108, the steering-reaction-force correction-amount calculating portion 20g refers to the preliminarily set characteristic diagram shown in FIG. 6 in order to set a steering-reaction-force correction amount $\Delta F_{fH}$, and outputs the steering-reaction-force correction amount $\Delta F_{fH}$ to the power-steering control unit 13. Upon receiving the steering-reaction-force correction amount $\Delta F_{fH}$, the power-steering control unit 13 subtracts an assist current according to the steering-reaction-force correction amount $\Delta F_{fH}$ from an assist current IP set based on the map, thereby reducing the assist amount.

In step S109, the steering-reaction-force correction-amount calculating portion 20g compares the lateral tire-force margin $F_{ym}$ with the preliminarily set threshold value C1. If the lateral tire-force margin $F_{ym}$ is smaller than the preliminarily set threshold value C1, the operation proceeds to step S110 where the steering-reaction-force correction-amount calculating portion 20g sends a command signal for commanding vibration at a predetermined frequency to the power-steering control unit 13 in addition to sending the signal indicating the steering-reaction-force correction amount $\Delta F_{fH}$. The operation then proceeds to step S111. On the other hand, if the lateral tire-force margin $F_{ym}$ is greater than or equal to the preliminarily set threshold value C1, the operation proceeds directly to step S111 without performing the output of a vibration adding signal in step S110).

In step S111, the individual-tire front-rear tire-force margin calculating portion 20h calculates a left-fronttire front-rear tire-force margin $F_{x0f\_l}$, a right-front-tire-force margin $F_{x0f\_r}$, a left-rear-tire front-rear tire-force margin $F_{x0r\_l}$, and a right-rear-tire front-rear tire-force margin $F_{x0r\_r}$ from the aforementioned expressions (18) to (21).

In step S112, the front-rear tire-force margin calculating portion 20i calculates a front-rear tire-force margin $F_{x0M}$ from the aforementioned expression (22).

In step S113, the accelerator-pedal-reaction-force correction-amount calculating portion 20j refers to the preliminarily set characteristic diagram shown in FIG. 7 in order to set an accelerator-pedal-reaction-force correction amount $\Delta F_{AP}$, and outputs the accelerator-pedal-reaction-force correction amount $\Delta F_{AP}$ to the accelerator-pedal reaction-force control unit 16. Upon receiving the accelerator-pedal-reaction-force correction amount $\Delta F_{AP}$, the accelerator-pedal reaction-force control unit 16 increases the accelerator-pedal reaction force by an amount corresponding to the input value.

In step S114, the accelerator-pedal-reaction-force correction-amount calculating portion 20j compares the front-rear tire-force margin $F_{x0M}$ with the preliminarily set threshold value C2. If the front-rear tire-force margin $F_{x0M}$ is smaller than the preliminarily set threshold value C2, the operation proceeds to step S115 where the accelerator-pedal-reaction-force correction-amount calculating portion 20j sends a command signal for commanding vibration at a predetermined frequency to the accelerator-pedal reaction-force control unit 16 in addition to sending the signal indicating the accelerator-pedal-reaction-force correction amount $\Delta F_{AP}$. The operation then proceeds to step S116. On the other hand, if the front-rear tire-force margin $F_{x0M}$ is greater than or equal to the preliminarily set threshold value C2, the operation proceeds directly to step S116 without performing the output of a vibration adding signal in step S115.

Figure 9:
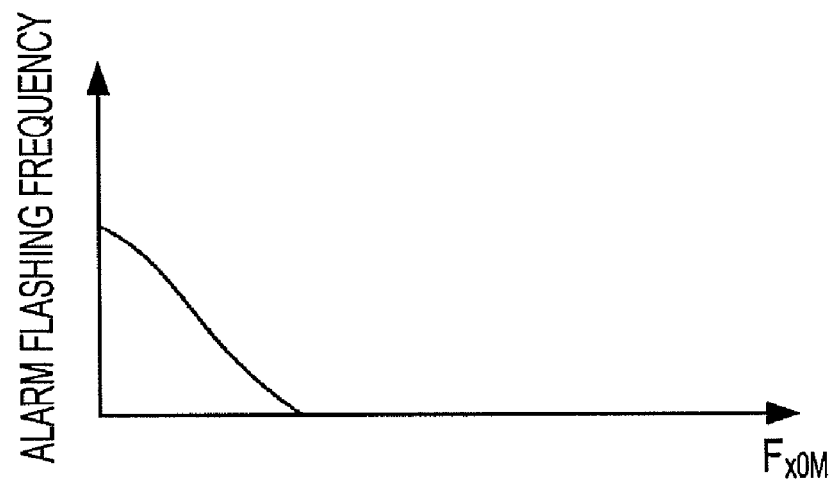
FIG. 9 is a characteristic diagram of an alarm flashing frequency set on the basis of a driving force margin.

In step S116, the alarm flashing-frequency setting portion 20k refers to the preliminarily set characteristic diagrams shown in FIGS. 8 and 9 in order to set an alarm flashing frequency, and outputs the alarm flashing frequency to the alarm-lamp flash driving unit 17. The operation then exits the program.

According to this embodiment of the present invention, the driving assist control unit 20 calculates a total driving force and individual-tire lateral tire-forces as current tire-force, and estimates ground loads acting on the individual tires. The driving assist control unit 20 then calculates permissible tire-force from the road-surface friction coefficient and the ground loads acting on the individual tires. Based on the permissible tire-force and the lateral tire-forces of the front tires, the driving assist control unit 20 determines lateral tire-force margins. The information control unit 20 then determines a steering-reaction-force correction amount in accordance with the lateral tire-force margins, and outputs the determined steering-reaction-force correction amount to the power-steering control unit 13. Moreover, the driving assist control unit 20 determines a front-rear tire-force margin on the basis of the permissible tire-force and the total driving force. The driving assist control unit 20 then determines an accelerator-pedal-reaction-force correction amount in accordance with the front-rear tire-force margin, and outputs the determined accelerator-pedal-reaction-force correction amount to the accelerator-pedal reaction-force control unit 16. In addition, the driving assist control unit 20 sets a flashing frequency for the alarm lamp 18 in accordance with the front-rear tire-force margin, and outputs the flashing frequency to the alarm-lamp flash driving unit 17. Consequently, since the operation of the driver is constantly assisted by activation of the actuators, such as the front steering wheel, the accelerator pedal control mechanism, and the alarm lamp in accordance with the continuously changing running condition of the vehicle, the driver can perform an optimal driving operation.

Although this embodiment applies three examples of means for assist the driver's operation, which are a steering reaction force, an accelerator-pedal reaction force, and an alarm lamp, the embodiment may alternatively apply one of or two of the three examples of means.

What is claimed is:
1. A vehicle driving assist system comprising:
road-surface friction coefficient estimating means configured to estimate a road-surface friction coefficient of a road where a vehicle is running;
ground-load estimating means configured to estimate a ground-load acting on a tire of the vehicle;

permissible tire-force estimating means configured to estimate a permissible tire-force being capable of acting on the tire on the basis of the road-surface friction coefficient and the ground-load;

current tire-force estimating means configured to estimate a current tire-force currently acting on the tire;

tire-force margin calculating means configured to calculate a tire-force margin by subtracting the current tire-force from the permissible tire-force; and actuator controlling means configured to activate an actuator warning a driver of the vehicle about the tire-force margin in accordance with a magnitude of the tire-force margin.

2. The vehicle driving assist system according to claim 1, wherein the tire-force margin calculating means calculates a lateral tire-force margin on the basis of a lateral tire-force currently acting in a lateral direction on a front tire and the permissible tire-force, and the actuator comprises a front steering wheel device configured to enable to give a reaction force of a steering wheel against a steering operation by a driver, and wherein the actuator controlling means controls the front steering wheel device so as to give the reaction force in accordance with the magnitude of the lateral tire-force margin.

3. The vehicle driving assist system according to claim 2, wherein the front steering wheel device is controlled so as to give the reaction force in accordance with the magnitude of a lower lateral tire-force margin between individual lateral tire-force margins on a left front tire and a right front tire.

4. The vehicle driving assist system according to claim 2, wherein the actuator controlling means controls the front steering wheel device so as to add vibration to the steering wheel in addition to the reaction force if the magnitude of the lateral tire-force margin is smaller than a preliminarily set threshold value.

5. The vehicle driving assist system according to claim 3, wherein the actuator controlling means controls the front steering wheel device so as to add vibration to a steering wheel in addition to the reaction force if the magnitude of the lower lateral tire-force margin is smaller than a preliminarily set threshold value.

6. The vehicle driving assist system according to claim 1, wherein the tire-force margin calculating means calculates a front-rear tire-force margin on the basis of a driving force currently acting in a front-rear direction on the tire and the permissible tire-force, and the actuator comprises an accelerator pedal control mechanism configured to enable to give a reaction force of an accelerator pedal against an accelerator pedal operation by a driver wherein the actuator controlling controls the accelerator pedal control mechanism so as to give the reaction force of in accordance with the magnitude of the front-rear tire-force margin.

7. The vehicle driving assist system according to claim 6, wherein the actuator controlling means controls the accelerator pedal control mechanism so as to add vibration to an accelerator pedal in addition to the reaction force if the magnitude of the front-rear tire-force margin is smaller than a preliminarily set threshold value.

8. The vehicle driving assist system according to claim 1, wherein the tire-force margin calculating means calculates a lateral tire-force margin on the basis of a lateral tire-force currently acting in a lateral direction on a front tire and the permissible tire-force, and the actuator comprises an alarm lamp configured to be enabled to adjust a flashing frequency, wherein the actuator controlling means controls the alarm lamp so as to adjust the flashing frequency in accordance with the magnitude of the lateral tire-force margin.

9. The vehicle driving assist system according to claim 8, wherein the alarm lamp is controlled so as to adjust the flashing frequency in accordance with the magnitude of a lower lateral tire-force margin between individual lateral tire-force margins on a left front tire and a right front tire.

10. The vehicle driving assist system according to claim 1, wherein the tire-force margin calculating means calculates a front-rear tire-force margin on the basis of a driving force currently acting in a front-rear direction on the tire and the permissible tire-force, the actuator comprises an alarm lamp configured to be enabled to adjust a flashing frequency and wherein the actuator controlling means controls the alarm lamp so as to adjust a flashing frequency in accordance with the magnitude of the front-rear tire-force margin.

11. The vehicle driving assist system according to claim 1 comprising both a lateral tire-force margin calculating means and a front-rear tire-force margin calculating means.

12. The vehicle driving assist system according to claim 11 wherein the actuator is at least one of a front steering wheel device actuator, a vehicle operator warning alarm actuator and an acceleration control mechanism actuator.

13. The vehicle driving assist system according to claim 12 comprising at least two of the actuators.

14. The vehicle driving assist system according to claim 12 comprising each of the three actuators.

* * * * *